Patented Dec. 6, 1949

2,490,691

UNITED STATES PATENT OFFICE 2,490,691

ALKYL POLYSILICATES

Carl M. Langkammerer, Wilmington, Del., assignor to E. I. du Pont de Nemours & Company, Wilmington, Del., a corporation of Delaware No Drawing. Application October 3, 1946, Serial No. 701,055

13 Claims. (Cl. 260—448.8)

This invention relates to the preparation of polymeric silicic acid esters. More particularly this invention relates to new fluid polymeric silicic acid esters and to a method for their preparation.

It is known that tetraethyl orthosilicate reacts with acetic acid in large molecular excess to form a silica gel, which is insoluble in organic solvents.

It is an object of this invention to provide a method of preparing fluid esters of polysilicic acid. Another object is to provide a readily controllable method for the preparation of high molecular weight polymeric esters of polysilicic acid. A further object is to provide new high molecular weight polymeric esters of polysilicic acid which are liquid and soluble in organic solvents. Other objects will appear hereinafter.

These objects are accomplished by the following invention in which a tetrahydrocarbo-orthosilicate is heated with one-half to two molar equivalents of an anhydrous aliphatic carboxylic acid until a fluid polymeric polysilicic acid ester is formed. The reaction of these organic esters of orthosilicic acid, for example tetraethyl silicate with one to two moles of glacial acetic acid is characterized by the formation of high molecular weight polysilicic acid esters, which are liquid and also soluble in organic solvents. These high molecular weight polysilicic acid esters have a molecular weight of over 10,000 as measured by boiling point elevation in benzene.

In carrying out the reaction of this invention with tetraethyl silicate the orthosilicate is mixed with an anhydrous aliphatic carboxylic acid, such as glacial acetic acid, in proportion of from one-half to two moles of acid per mole of orthosilicate. The reactants are refluxed for a period of about one hour. Then the excess acetic acid, tetraethyl silicate and the by-product ethanol and ethyl acetate are distilled off under vacuum. With one mole of acid per mole of silicate, there is formed a high molecular weight liquid polymer soluble in organic solvents. If two moles of acid per mole of silicate ester are used a high molecular weight polymer with some degree of branching or ring closure results, but which is still liquid and soluble in organic solvents. With one-half mole of acid per mole of tetraethyl silicate, the chief product is a dimer, hexaethyldisilicate.

The molecular ratio of the tetra-orthosilicate to the carboxylic acid can be varied from one-half to two moles of acid per mole of orthosilicate in order to obtain soluble products. The preferred molecular ratio of orthosilicate to acid is one to one. If more than two moles of acid per mole of orthosilicate are employed, the resulting product is normally an insoluble and infusible gel. If less than one-half mole of orthosilicate is employed a substantial portion of the orthosilicate is recovered unchanged. The reaction of the orthosilicates with the aliphatic carboxylic acids can be carried out at temperature from the boiling point of the reactants to 400° C.

This invention is further illustrated by the following examples in which parts are by weight unless otherwise specified.

Example I

Two hundred eight parts (1 mole) of tetraethyl silicate and 120 parts (2 moles) of glacial acetic acid were heated under a distillation column and allowed to reflux for 1 hour. A total of 148 parts of distillate was obtained while distilling at a temperature of 72 to 73° C. at atmospheric pressure. An additional 46 parts was obtained by raising the temperature of the distilling bath to 135° C. and lowering the pressure to 2 mm. The residue was a vascous, water-white polymer.

Analysis: Calculated for $[C_8H_{15}Si_2O_6]_xC$, 30.1%; H, 6.33%; found C, 30.4%; H, 6.31%.

Example II

A mixture of 1248 g. (6 moles) of ethyl orthosilicate and 360 g. (6 moles) of acetic acid was placed in the pot of an efficient still. The mixture was heated at 140 to 200° C. and 675 g. of an azeotrope of ethyl alcohol and ethyl acetate distilled over at a temperature of 70–71° C. at atmospheric pressure. The pressure was then decreased to 20 mm. and 51 g. of ethyl silicate distilled over at a temperature of 66–67° C. The pressure was then reduced to 5 mm. and 28.5 g. of acetoxytriethoxysilicane distilled over at 63–65° C. The distillation temperature then increased to 98° C. and 49 g. of hexaethyldisilicate distilled. The pressure was then gradually reduced to 0.25 mm. and the pot temperature increased to 220° C., whereupon 60 g. of a mixture of low molecular weight ethyl polysilicates distilled at a distillation temperature ranging from 66° C. at 2 mm. to 86° C. at 0.4 mm. At this point there remained in the pot of the still 635 g. of a rather fluid, pale yellow liquid. This liquid was transferred to a molecular still and distilled at a pressure of $10^{-3}$ mm. and at a temperature which was gradually increased from 65° C. to 273° C. In this way the liquid was separated into fractions of increasing molecular weight and viscosity. The molecular weights were determined by boiling point elevation in benzene.

By tritation in alcohol with standard alcoholic potassium hydroxide using bromthymol blue as an indicator, the polysilicates were shown to contain small amounts of up to 5% of chemically combined acetoxy groups. The properties of the cuts so obtained are shown in the accompanyng table.

| Cut No. | Distillation Temp. °C. | Wt. Grams | Mol. Wt. | Viscosity Centipoise 25° C. | Per Cent Si | Per Cent Acetoxy |
|---|---|---|---|---|---|---|
| 1 | 65 | 62.0 | 700 | 4.10 | 17.6 | 2.53 |
| 2 | 65–67 | 55.0 | 841 | 4.80 | 18.2 | 2.80 |
| 3 | 87–90 | 121.5 | 1,370 | 8.07 | 19.2 | 3.14 |
| 4 | 115–117 | 67.0 | 1,290 | 15.66 | 19.2 | 3.26 |
| 5 | 119–132 | 60.5 | 1,380 | 19.42 | 19.3 | 4.11 |
| 6 | 150–160 | 65.0 | 1,830 | 26.83 | 19.6 | 3.69 |
| 7 | 185–189 | 59.5 | 1,950 | 35.29 | 19.8 | 4.53 |
| 8 | 189–221 | 48.0 | 4,600 | 44.66 | 19.8 | 3.44 |
| 9 | 246–267 | 41.5 | >10,000 | 71.76 | 20.5 | 4.77 |
| 10 | 273 | 25.5 | | 92.77 | 21.0 | 4.88 |
| 11 | Residue | 29.5 | | 241.9 | 21.1 | 4.91 |

*Example III*

Thirty-two grams (0.1 mole) of butyl orthosilicate and 6 g. (0.1 mole) of glacial acetic acid were heated at total reflux for 6 hours and then the by-product binary consisting of n-butyl alcohol and n-butyl acetate was allowed to distill slowly from the mixture. When all of the binary had been removed, the pressure was reduced to 15 mm. and the tempertaure of the heating mantle raised to 400° C. No further distillate was obtained. The product remaining in the flask was a clear liquid, which gave the values of 682 and 658 on molecular weight determination.

By replacing butyl orthosilicate with an equivalent amount of allyl orthosilicate, a viscous fluid product was obtained, which on baking gave a hard film.

The products of this invention are colorless to pale-yellow liquids increasing in viscosity with increasing molecular weight. They are readily soluble in organic solvents such as chloroform, ethanol, butanol, petroleum ether, ethyl ether, benzene, and the like. The rate of hydrolysis in water is dependent in part on the nature of the groups attached to the polymer and in general is less than the corresponding orthosilicates. The products show a very low decrease in viscosity with increasing temperature as compared with other organic liquids.

The tetrahydrocarbo-orthosilicates have the general formula $Si(OR)_4$ where R is a hydrocarbon radical. The preferred orthosilicates are those where R is alkyl, alkenyl, aryl or aralkyl. Examples of tetra-orthosilicates which can be used in this invention include 2-ethylhexyl, propyl, methallyl, crotyl, tiglyl, benzyl, cyclohexyl, phenyl, beta-naphthyl, and stearyl orthosilicates. The tetraalkyl-orthosilicates are the preferred group, of which tetraethyl-orthosilicate is most preferred for use in this invention.

In addition to acetic acid, other aliphatic carboxylic acids can be used in this invention, for example propionic, butyric, valeric, pelargonic, oxalic, malonic and adipic acids. Unsaturated aliphatic carboxylic acids can also be used, for example maleic, acrylic, crotonic and methacrylic acids. Of these the saturated lower aliphatic monocarboxylic acids of 2 to 4 carbon atoms are preferred, and acetic acid is most preferred.

The high molecular weight products of this invention are useful as modifiers for alkyd resins since they produce improved hardness and faster drying time. They are also useful as plasticizers for resinous materials. The low viscosity index makes the polymers useful for lubricants in sealed systems.

As many apparently widely different embodiments of this invention may be made without departing from the spirit and scope thereof, it is to be understood that I do not limit myself to the specific embodiments thereof except as defined in the appended claims.

I claim:

1. A method for preparing a fluid polymeric silicic acid ester which consists in heating under reflux a tetraalkyl orthosilicate with from one-half to two molar equivalents of an anhydrous unsubstitued saturated lower aliphatic monocarboxylic acid containing from 2 to 4 carbon atoms.

2. A method for preparing a fluid polymeric silicic acid ester which consists in heating under reflux a tetraalkyl orthosilicate with from one to two molar equivalents of an anhydrous unsubstituted saturated lower aliphatic monocarboxylic acid containing from 2 to 4 carbon atoms.

3. A method for preparing a fluid polymeric silicic acid ester which consists in heating under reflux tetraethyl orthosilicate with from one-half to two molar equivalents of an anyhdrous unsubstitued saturated lower aliphatic monocarboxylic acid containing from 2 to 4 carbon atoms.

4. A method for preparing a fluid polymeric silicic acid ester which consists in heating under reflux a tetraalkyl orthosilicate with from one-half to two molar equivalents of glacial acetic acid.

5. A method for preparing a fluid polymeric silicic acid ester which consists in heating under reflux a tetraalkyl orthosilicate with from one to two molar equivalents of glacial acetic acid.

6. A method for preparing a fluid polymeric silicic acid ester which consists in heating under reflux tetraethyl orthosilicate with from one to two molar equivalents of an anhydrous unsubstituted saturated lower aliphatic monocarboxylic acid containing from 2 to 4 carbon atoms.

7. A method for preparing a fluid polymeric silicic acid ester which consists in heating under reflux tetraethyl orthosilicate with from one-half to two molar equivalents of glacial acetic acid.

8. A method of preparing an ethyl polysilicate which is liquid and soluble in organic solvents which consists in heating under reflux a tetraethyl orthosilicate with from 1 to 2 molar equivalents of glacial acetic acid.

9. A method of preparing an alkyl polysilicate which is liquid and soluble in organic solvents and has a molecular weight of over 10,000 as measured by boiling point elevation in benzene which consists in heating under reflux a tetraalkyl orthosilicate with from one molar equivalent of glacial acetic acid.

10. A method of preparing an ethyl polysilicate which is liquid and soluble in organic solvents and has a molecular weight of over 10,000 as measured by boiling point elevation in benzene which consists in heating under reflux a tetraethyl orthosilicate with from one molar equivalent of glacial acetic acid.

11. An alkyl polysilicate which is liquid and soluble in organic solvents and has a molecular weight of over 10,000 as measured by boiling point elevation in benzene and which is obtained by the process set forth in claim 1.

12. An alkyl polysilicate containing acetoxy groups which is liquid and soluble in organic solvents and has a molecular weight of over 10,000 as measured by boiling point elevation in benzene and which is obtained by the process set forth in claim 5.

13. An ethyl polysilicate containing acetoxy groups which is liquid and soluble in organic solvents and has a molecular weight of over 10,000 as measured by boiling point elevation in benzene and which is obtained by the process set forth in claim 8.

CARL M. LANGKAMMERER.

REFERENCES CITED

The following references are of record in the file of this patent:

FOREIGN PATENTS

| Number | Country | Date |
|---|---|---|
| 568,545 | Germany | Jan. 21, 1933 |

OTHER REFERENCES

Konrad "Annalen" (Leibig), vol. 474, pages 276–295 (1929).